Nov. 15, 1932.    S. S. GEIPEL    1,888,166

GASKET

Filed April 16, 1931

WITNESSES

INVENTOR
Stanley S. Geipel
BY
ATTORNEYS.

Patented Nov. 15, 1932

1,888,166

UNITED STATES PATENT OFFICE

STANLEY S. GEIPEL, OF NEW BRUNSWICK, NEW JERSEY, ASSIGNOR TO METALLO GASKET COMPANY, OF NEW BRUNSWICK, NEW JERSEY, A CORPORATION OF NEW JERSEY

GASKET

Application filed April 16, 1931. Serial No. 530,679.

This invention relates to gaskets used wherever needed for withstanding high pressures and temperatures.

The general object of the invention is to improve the construction of gaskets, so as to be reliable, efficient and durable in use, and of substantial design.

Figure 1:
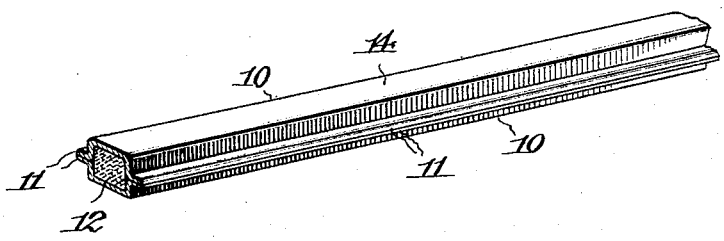
Figure 2:
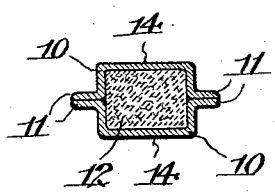

The nature of the invention and its distinguishing features and advantages will appear when the following specification is read in connection with the accompanying drawing, in which Figure 1 is a perspective view of a section of a gasket constructed in accordance with the invention;

Figure 2 is a cross section of the gasket.

It is to be understood that the gasket of the present invention may be made of any desired shape or size, and from any suitable materials. In the illustrated embodiment of the invention, the gasket consists of two metal channel-shaped pieces or members 10, laid together, and having their adjacent longitudinal marginal edge portions fastened together throughout the length thereof. The longitudinal edge portions, designated 11, are directed laterally outward. The portions 11 overlying each other flatwise and are fastened together in a practical manner by brazing or welding them although any other preferred fastening may be adopted to securely join the portions 11 together throughout the length thereof. The pieces or members 10 being of channel shape or formation provide a continuous space which is preferably filled with a suitable material such as asbestos, fibers or metallic filling material or packing 12. It will be apparent that the junctures between the pieces or members 10 are at the opposite sides of the gasket and occur in a plane between said faces, and that the two contactual faces 14 of the gasket upon which the joint is made are of uniform thickness. The contactual faces 14 will be uniform and smooth and will make a fluid-tight joint when placed between the two flat surfaces.

I claim:

1. A gasket consisting of two metal channel-shaped pieces laid together and having their side edge portions at each side of the gasket directed laterally outward and suitably joined together, said pieces thus joined forming a continuous space, and a suitable filler in said space.

2. A gasket constructed of two channel shaped pieces laid together to provide two flat contact surfaces, said pieces having their side edge portions at each side of the gasket directed laterally outward, said edge portions overlying each other flatwise and being suitably joined, said pieces thus joined forming a continuous space, and a suitable filler in said space.

STANLEY S. GEIPEL.